Figure 1:
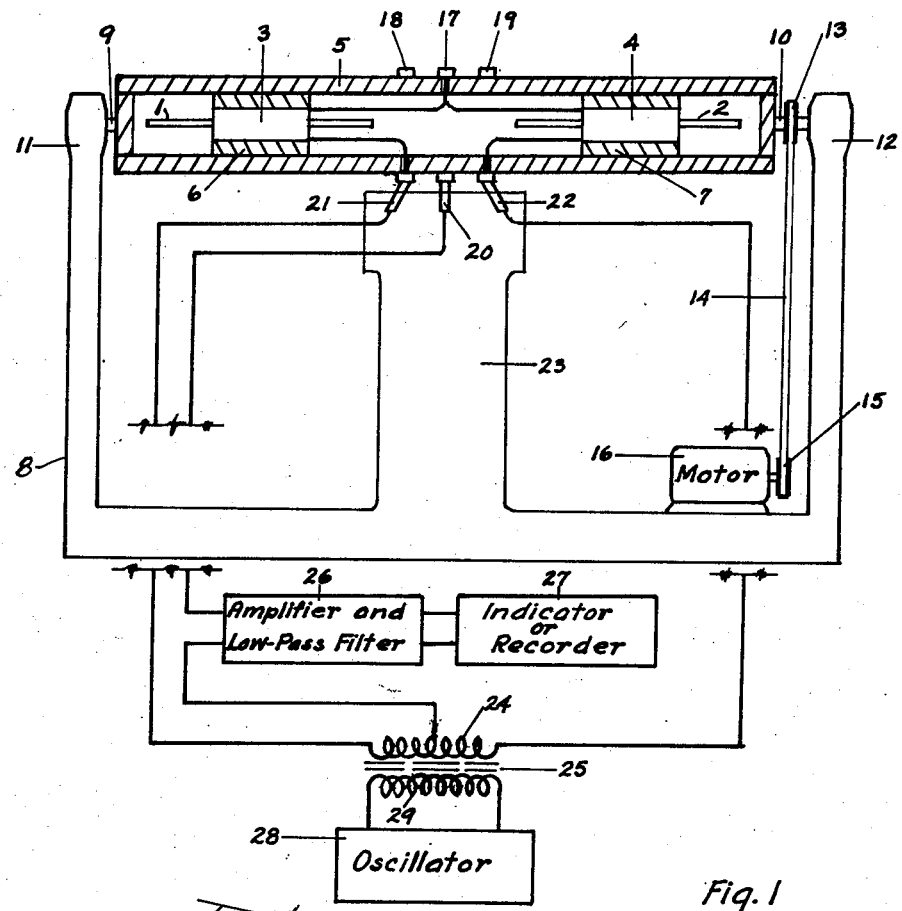

May 31, 1955   D. G. C. HARE   2,709,783
MAGNETIC INCREMOMETER OR GRADIOMETER
Filed April 21, 1944

Inventor
Donald G. C. Hare

United States Patent Office 2,709,783
Patented May 31, 1955

2,709,783

MAGNETIC INCREMOMETER OR GRADIOMETER

Donald G. C. Hare, Roslyn, N. Y., assignor to the United States of America as represented by the Secretary of the Navy Application April 21, 1944, Serial No. 532,153

4 Claims. (Cl. 324—43)

This invention relates to an improved magnetic incremometer or gradiometer for measuring increments or differences in magnetic fields, and more particularly to an incremometer or gradiometer especially adapted for use in measuring increments in the earth's magnetic field.

In the past, magnetic incremometers or gradiometers have been proposed which employ a pair of elements mounted in such a manner that their magnetic axes are parallel. When such an instrument is oriented so that the magnetic axes of both of its elements are closely in alignment with the earth's magnetic field, the difference between the outputs of these elements represents very closely the difference or increment in the magnetic field strength existing at the respective elements. With this orientation, each of the elements is relatively insensitive to small misalignments, since its output is proportional to the cosine of the relatively small angle which its magnetic axis makes with the earth's magnetic field.

When such a prior-art incremometer or gradiometer is oriented so that the magnetic axes of both of its elements are approximately perpendicular to the earth's magnetic field, however, the difference between the outputs of the elements is seriously affected by relatively small departures from parallelism of the two elements. This distinctly detrimental effect is inherent in the fact that the response of the elements when thus oriented is a function of the cosine of the relatively large angle between their magnetic axes and the earth's magnetic field. In cases where the magnetic increment to be measured is very small compared with the absolute strength of the magnetic field surrounding the elements, the effect of these minor misalignments may readily be such as to render useless the results which can be obtained from an instrument of feasible mechanical design, especially one capable of withstanding the shocks and rapid accelerations encountered by a portable device in ordinary service. Furthermore, even though true parallelism may be achieved initially and the elements mechanically secured accordingly, there is always the likelihood that the magnetic axes of the individual elements may shift slightly due to shock or other causes with respect to their geometric axes, thereby rendering such careful initial mechanical alignment ineffectual.

While the inherent disadvantage of the ordinary type of incremometer or gradiometer outlined above is detrimental regardless of the type of elements employed, due to the obvious difficulty both of initially attaining and of successfully maintaining true parallelism between the magnetic axes of the elements, the problem becomes especially acute when elements utilizing ferromagnetic cores are employed. The ferromagnetic cores of such elements must necessarily be mounted in such a manner as to relieve them of appreciable mechanical stress. It is obvious that a mounting flexible enough to achieve this end is utterly incapable of maintaining the degree of parallelism which is inherently required in sensitive instruments of the type here contemplated.

It is an object of the present invention, therefore, to provide an improved magnetic incremometer or gradiometer which is free from the limitations of previously known devices, and which thus is capable of substantially greater precision and reliability in measuring small magnetic increments. It is proposed to substantially eliminate the effect of minor misalignments of the elements by rotating these elements about an axis substantially parallel to their respective magnetic axes. The magnetic increment to be measured may vary periodically, as when caused by A.-C. power circuits. It may fluctuate in a roughly periodic manner, as when there is relative movement between the incremometer and a local magnetic disturbance. Under such circumstances the period of rotation of the elements is made short compared with the time of appreciable change in the magnetic increment. The combined output of the elements, which in general varies somewhat if either magnetic axis is not exactly parallel with the axis of rotation, is averaged over a period of at least as long as that required for one revolution of the elements. In this way, the effect of any misalignment which may be present is minimized to such an extent that it ceases to place an inherent limitation on the precision of the instrument, regardless of the latter's orientation with respect to the magnetic field under observation. For example, let it be assumed that, for an error of 0.5 gamma, the elements of an ordinary instrument must be maintained in alignment within $2 \times 10^{-4}$ degree. By rotating the elements in accordance with the present invention, the misalignment may be as great as $1.4 \times 10^{-2}$ degree, or 70 times as great, without increasing the error.

Although the arrangement of the present invention may be successfully and advantageously employed with any type of elements, it will be found to be particularly useful in those cases where the elements employed utilize a ferromagnetic core. In such cases, the minor misalignments necessarily resulting from the flexibility of the mounting of the ferromagnetic core members are effectively prevented from introducing appreciable errors in the incremental measurements.

In accordance with the present invention, there is provided, in a magnetic incremometer or gradiometer, a pair of elements and means for supporting these elements so that their magnetic axes are substantially parallel. Means are also provided for rotating the elements simultaneously about parallel axes, substantially coinciding respectively with the magnetic axes of the elements, at a period short compared with the periods of the magnetic increments to be measured. Furthermore, means are provided for averaging the combined output of the elements over a period not shorter than that required for one revolution thereof.

Although it is within the scope of the invention to mount the elements in any position such that their magnetic axes are substantially parallel, and to provide means for rotating them simultaneously about parallel axes substantially coinciding respectively with their magnetic axes, such a construction is relatively difficult to achieve in practice, due to the problem of maintaining exact parallelism between the axes of rotation. In a preferred embodiment of the invention, therefore, the elements are mounted so that their magnetic axes are substantially coaxial, and the two elements are rotated simultaneously about their common axis. Such a construction is relatively easy to achieve in practice, since the two elements may be mounted upon a single member and rotated as a unit. It is such a preferred embodiment which, by way of example, will be shown in the drawings and described in detail below.

For a better understanding of the invention, together with other and further objects thereof, reference is made to the following description taken in connection with the accompanying drawings, and its scope will be pointed out in the appended claims.

Figure 2:
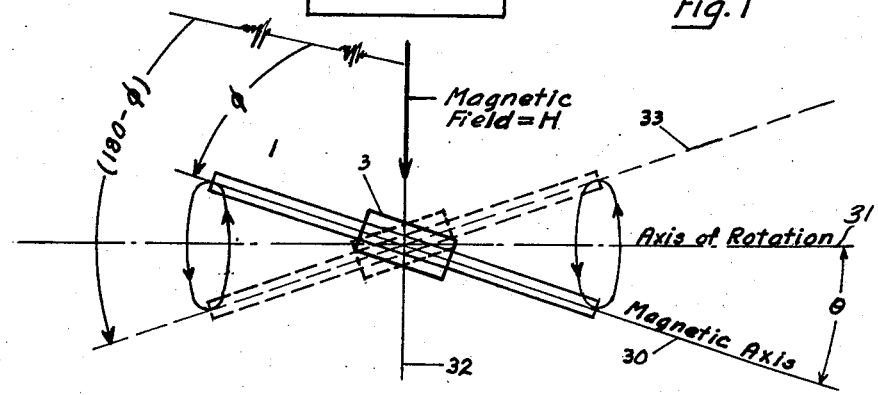

In the accompanying drawings:

Fig. 1 shows, partly in section and partly in block form, an improved magnetic incremometer or gradiometer in accordance with the present invention; and Fig. 2 illustrates, in diagrammatic form, the theory of operation of the present invention.

Referring now to Fig. 1 of the drawings, there is shown a pair of detector elements having respectively magnetic cores 1 and 2 and windings 3 and 4. These cores and windings, although respectively substantially identical, have been designated by separate reference numerals for simplicity of explanation. Elements 1—3 and 2—4 are mounted in substantially coaxial relation within nonmagnetic tube 5, in any suitable manner, as for example by means of bushings 6 and 7. Tube 5 is rotatably supported on frame 8 by means of shafts 9 and 10, which are respectively journaled in bearings 11 and 12. Shaft 10 carries pulley 13 which is driven by means of belt 14 from pulley 15 mounted on the shaft of motor 16.

Windings 3 and 4 are connected in series-aiding relation, their common terminal being connected to slip ring 17 mounted on tube 5, and their other terminals being connected respectively to slip rings 18 and 19, also carried by tube 5. Slip rings 17, 18 and 19 are respectively engaged by brushes 20, 21, and 22, which are supported on projection 23 of base 8.

Center-tapped secondary winding 24 of transformer 25 is connected between brushes 21 and 22. The center tap of winding 24 is connected to one input terminal of amplifier and low-pass filter unit 26, the other input terminal of which is connected to brush 20. The output of unit 26 is connected to indicator or recorder unit 27. The output of driver oscillator 28 is connected to primary winding 29 of transformer 25.

In operation, tube 5, and hence elements 1—3 and 2—4, are rotated at a period short compared with the periods of the magnetic increments to be measured, by means of motor 16 through belt 14. Uninterrupted connections with windings 3 and 4 are secured during this rotation by means of slip rings 17, 18 and 19 in conjunction with brushes 20, 21 and 22.

The pulses generated by driver oscillator 28 are supplied, through transformer 25, to windings 3 and 4 in such a manner that magnetic cores 1 and 2 are periodically magnetized beyond saturation in the same direction. The circuit arrangement is such that the difference in the signal outputs from elements 1—3 and 2—4 is supplied to amplifier and low-pass filter unit 26. The low-pass filter within unit 26 has a cutoff frequency well below the frequency of rotation of tube 5, so that the output signal from unit 26, which is supplied to indicator or recorder unit 27, is substantially unaffected by the fact that elements 1—3 and 2—4 are being rotated. It will be apparent, therefore, that the output indications or recordings produced by unit 27 will represent faithfully the difference or increment in the magnetic field at elements 1—3 and 2—4, and will not be affected adversely by the arrangement here disclosed for minimizing or eliminating errors due to minor misalignments of the elements.

The theory of operation of the present invention will be better understood by reference to Fig. 2. There is shown a magnetic element 1—3 having a magnetic axis 30 and being arranged to rotate as indicated about an axis of rotation 31. By way of illustration, the magnetic field having a value H is shown lying along a line 32, which is perpendicular to axis of rotation 31. Magnetic axis 30 makes an angle of $\phi$ degrees with line 32, so that the component of the magnetic field to which the output of element 1—3 corresponds in this position is equal to $H \cos \phi$. Now let it be assumed that element 1—3 is rotated 180 degrees about axis of rotation 31 to a new position indicated in broken lines, so that its magnetic axis assumes the position shown by broken line 33.

Axis 33 makes an angle of $(180-\phi)$ degrees with line 32, so that the component of the magnetic field to which element 1—3 now responds is equal to $H \cos (180-\phi)$ or $-H \cos \phi$. It will be apparent, therefore, that the error in the output signal of the element, when the latter is out of alignment in one sense, is substantially cancelled by the error which results from the effect of misalignment in the opposite sense due to the revolution of the element through 180 degrees. Such effective cancellation is secured due to the fact that the combined output of elements 1—3 and 2—4, as shown in Fig. 1, is averaged over an interval at least as long as that required for tube 5 to make a single revolution. This averaging results from the presence of the low-pass filter in unit 26.

Again referring to Fig. 2, it will be observed that magnetic axis 30 makes an angle of $\theta$ degrees with axis of rotation 31. This relationship remains constant during rotation of element 1—3 about axis 31, and its effect is to produce a very small decrease in the measured value of the magnetic field along axis 31. If the actual value of the field is taken as $H_{31}$, the resultant measured field will be equal to $H_{31} \cos \theta$. In practice the angle $\theta$ is so small that this effect, being a second-order function of the angle, is inappreciable. Furthermore, if the misalignment remains constant for the period of measurement, it may be entirely corrected by increasing the sensitivity of the element by an amount proportional to $1/\cos \theta$.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a magnetic incremometer or gradiometer, a pair of detector elements having an output circuit, means for supporting said elements so that their magnetic axes are substantially parallel, means for rotating said elements simultaneously about parallel axes substantially coinciding respectively with said magnetic axes at a short period, and filter means connected in said output circuit for averaging the combined output of said elements over a period not shorter than that required for one revolution thereof.

2. Apparatus for recording magnetic increments wherein the magnetometer elements are rotated about an axis to eliminate distortion due to misalignment of the elements comprising, series connected magnetometer elements mounted so that the magnetic axes lie in the same straight line, means for rotating the magnetometer elements about the same straight line, a transformer having a primary winding and a center-tapped secondary winding, said secondary winding and said magnetometer elements connected in an electrical bridge arrangement having an output circuit between said center tap and the electrical junction of said magnetometer elements, a driving oscillator connected to the primary of the transformer, a low pass filter connected in said output circuit for eliminating the misalignment distortion from the output circuit, and a device controlled by the output of the filter for recording the magnetic increments.

3. Apparatus for recording magnetic increments, said apparatus comprising a pair of magnetometer elements including a core and a coil and having an output circuit, filter means connected in said output circuit, means mounting said magnetometer elements in spaced relation with the core axes extending in substantially the same direction, supporting means, said mounting means being mounted in said supporting means, motive means operatively connected to said mounting means for rotating said mounting means and thereby rotating said magnetometer elements about axes extending in the same direction, the rotation of said magnetometer elements about the last-mentioned axes eliminating distortion due to slight differences in the directions in which the first-mentioned axes extend.

4. Apparatus for recording magnetic increments, said apparatus comprising a pair of magnetometer elements including a core and a coil, means mounting said magnetometer elements in spaced relation with the core axes extending in substantially the same direction, supporting means, said mounting means being rotatably mounted in said supporting means, motive means operatively connected to said mounting means for rotating said mounting means and thereby rotating said magnetometer elements about axes extending in the same direction, the rotation of said magnetometer elements about the last-mentioned axes eliminating distortion due to slight differences in the directions in which the first-mentioned axes extend, a transformer having a secondary, said secondary and said magnetometer elements connected to form an electrical bridge having an output circuit, a driving oscillator connected to the primary of said transformer, and a low pass filter connected in said output circuit for eliminating the distortion frequency from the output circuit of said elements.

References Cited in the file of this patent

UNITED STATES PATENTS

| | | |
|---|---|---|
| 2,335,117 | Harrison | Nov. 23, 1943 |
| 2,379,716 | Hull | July 3, 1945 |
| 2,390,051 | Barth | Dec. 4, 1945 |
| 2,406,870 | Vacquier | Sept. 3, 1946 |
| 2,407,202 | Vacquier | Sept. 3, 1946 |
| 2,412,612 | Godet | Dec. 17, 1946 |
| 2,427,666 | Felch et al. | Sept. 23, 1947 |